Patented Mar. 26, 1940

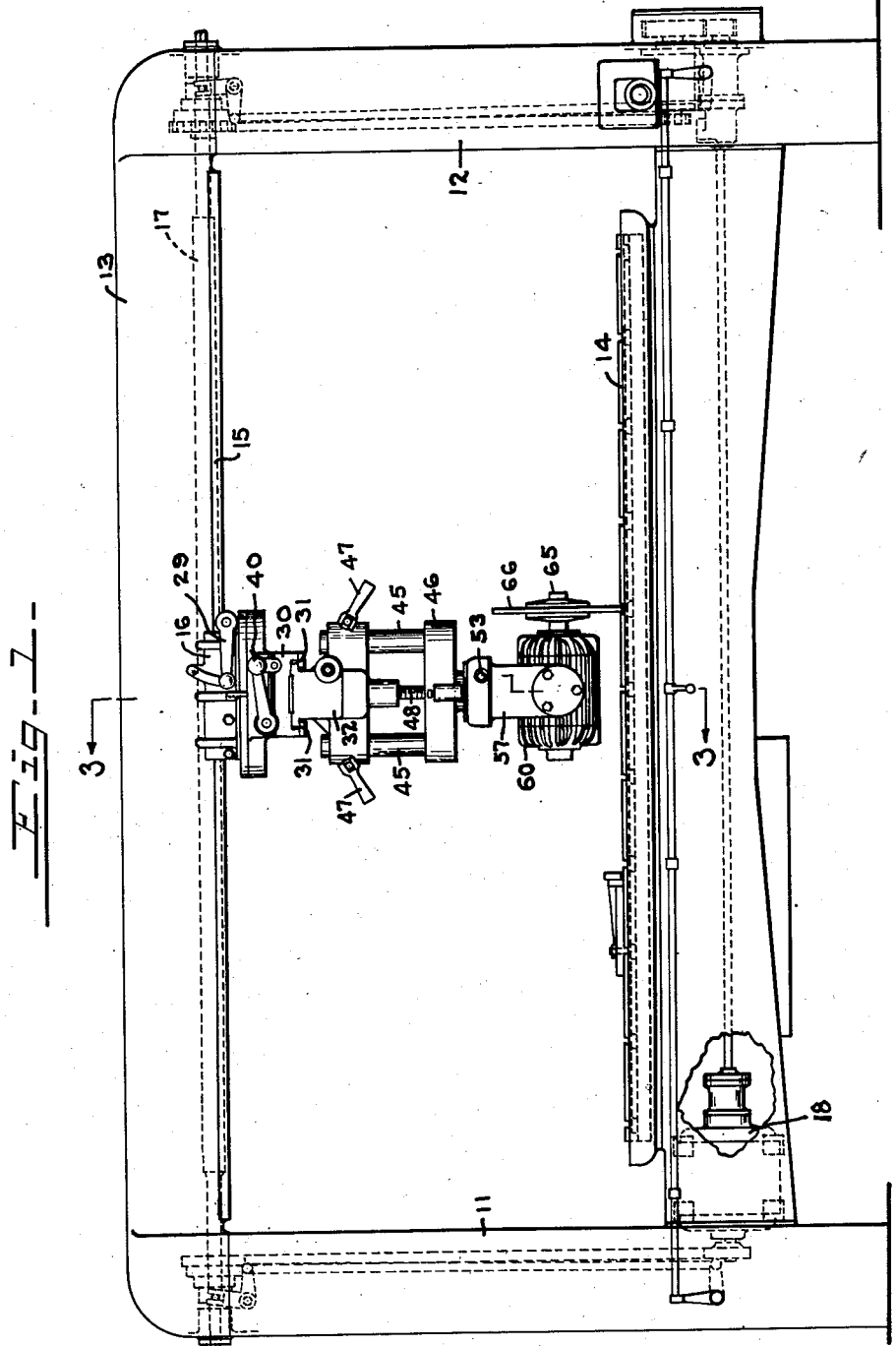

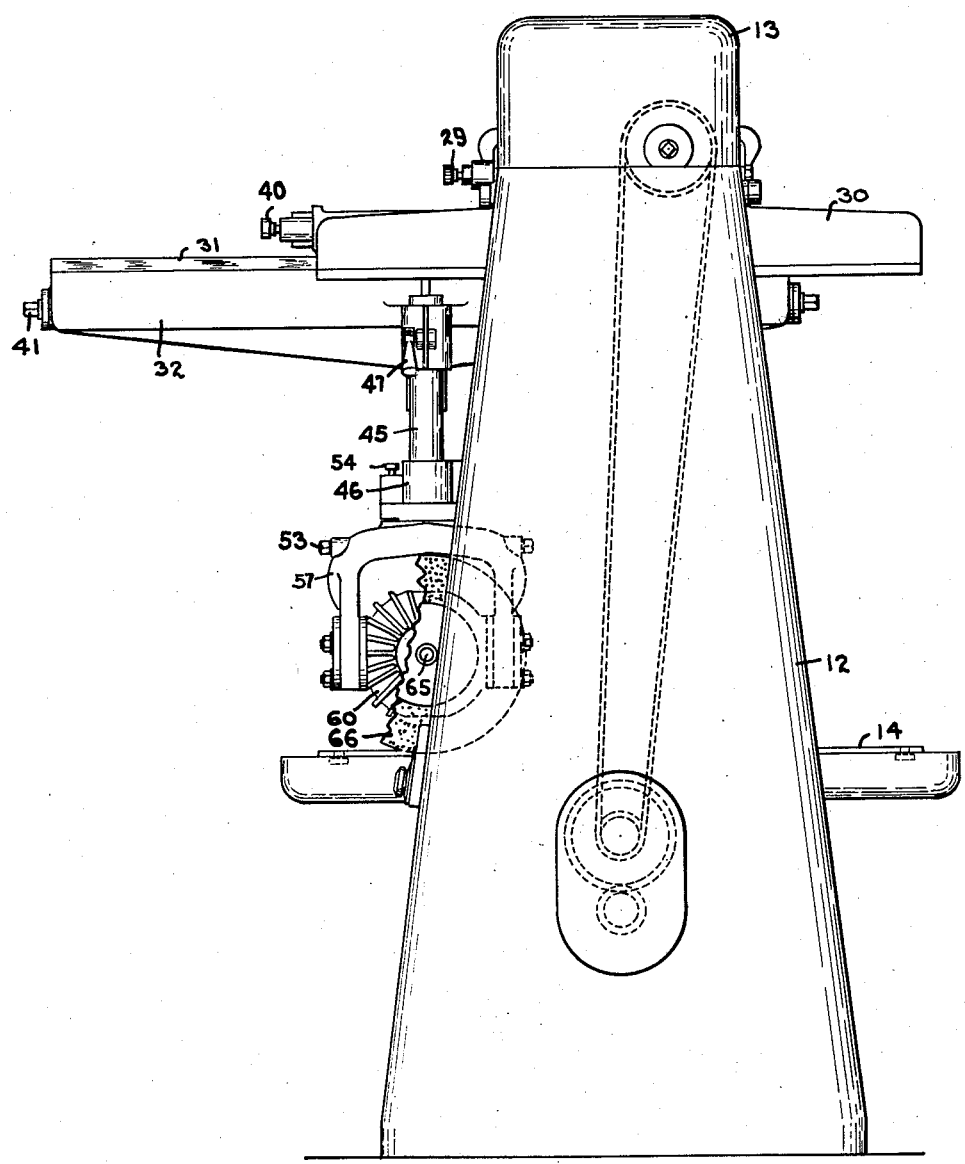

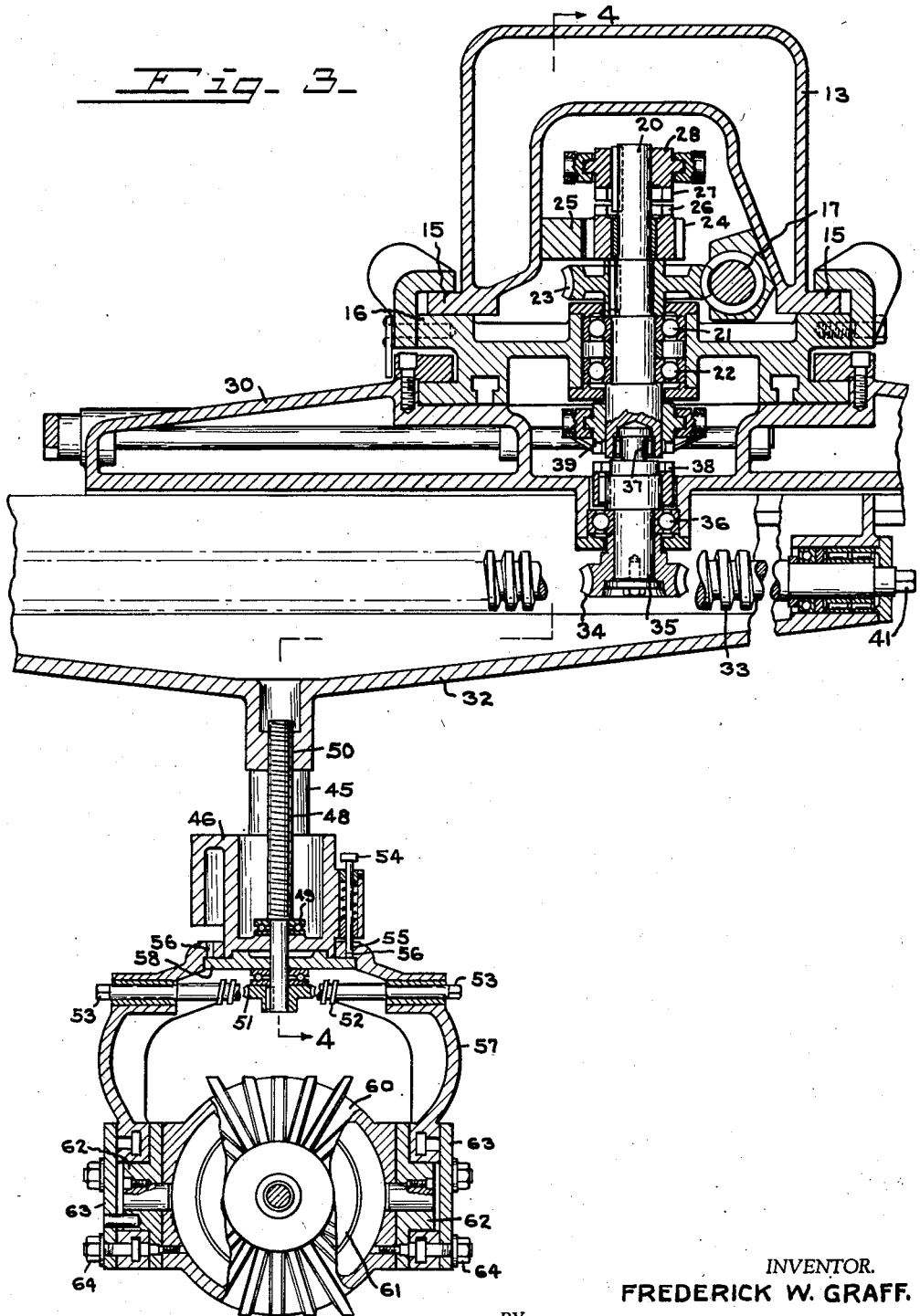

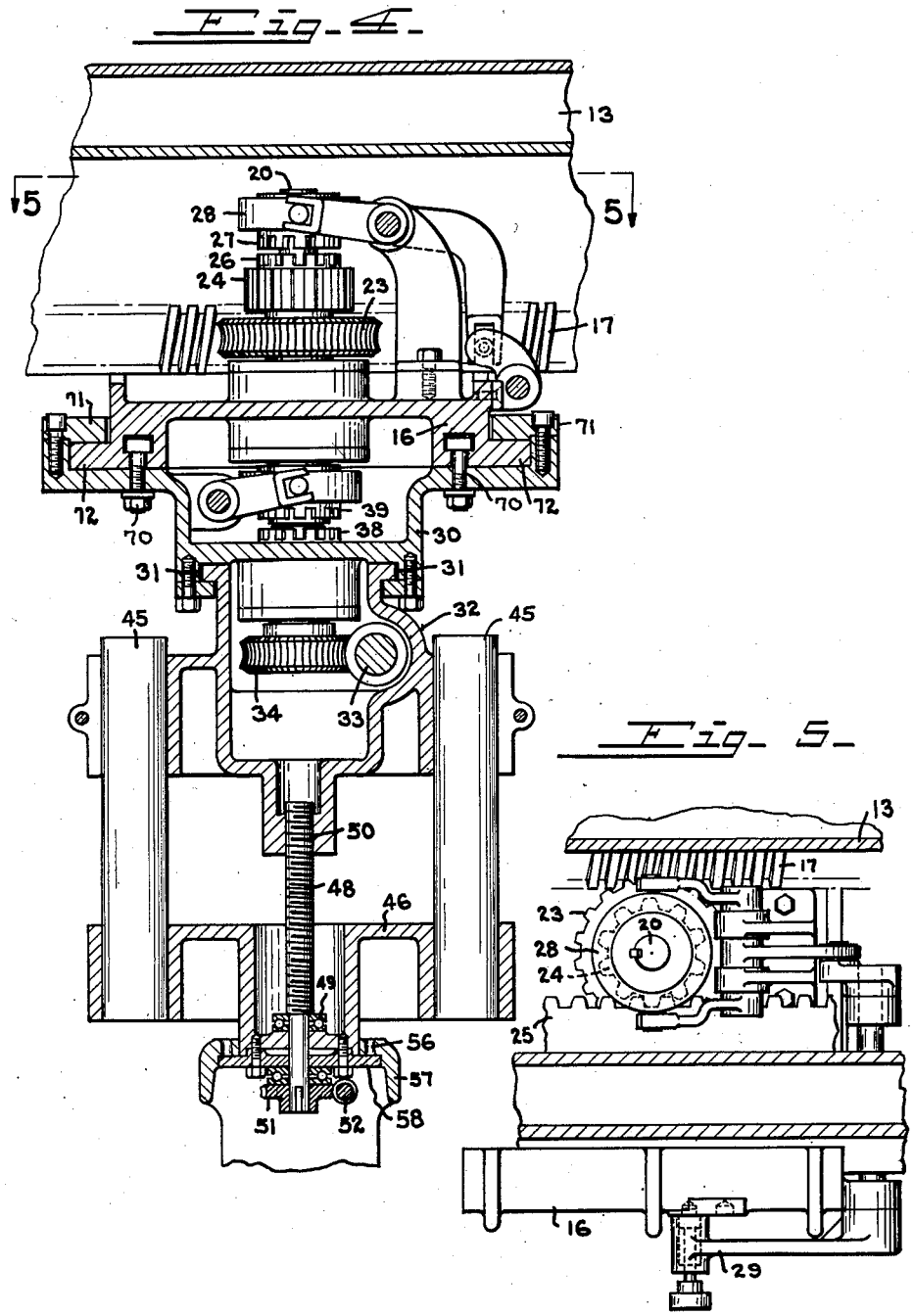

2,195,108

UNITED STATES PATENT OFFICE 2,195,108

UNIVERSAL CUTTING MACHINE

Frederick W. Graff, Sheboygan, Wis.

Application April 7, 1938, Serial No. 200,643

9 Claims. (Cl. 51—34)

My invention relates to a new and improved cutting machine wherein the tool holder is mounted on a head movable lengthwise of the machine and having a cross-head movable transversely with relation to the first head for moving a tool in various longitudinal and transverse planes.

A further feature of my improved machine provides means for tilting or rotating the tool holder for cutting bevels or other tangent cuts.

The object of my invention is to provide a machine with a super-structure forming a track for a tool supporting carriage. A further object is to provide the carriage with a rotatable cross-slide on which a tool supporting head traverses and capable of being power driven in a plane transverse of the movement of the carriage. A further object provides novel means for mounting an electric motor arranged to carry the cutting tool and adjustable in various universal positions. A further object is to provide means on the machine for rigidly supporting the work and providing power means for operating a suitable tool capable of movement in various universal directions on the work.

My invention will be further readily understood from the following description and claims, and from the drawings, in which latter:

Fig. 1 is a front view of my improved machine.

Fig. 2 is an end view of the same.

Fig. 3 is a vertical cross-section of the head, taken in the plane of the irregular line 3—3 of Fig. 1.

Fig. 4 is a vertical section, taken in the plane of the irregular line 4—4 of Fig. 3; and, Fig. 5 is a horizontal section of a detail of the same, taken in the plane of the line 5—5 of Fig. 4.

My improved machine comprises vertical supports 11 and 12, to which a super-structure 13 is suitably secured. A bed 14 is located below the super-structure 13. The bed has suitable T slots therein to permit the clamping of flat slab material thereon.

The super-structure 13 is provided with runways 15 arranged to support a head 16. A feed screw 17 is journaled in the super-structure and is suitably driven by means of a fluid motor 18 having suitable connections, controls and clutches for rotating the feed screw 17 at various speeds in one direction and for rapid reverse operation in the opposite direction. A vertical shaft 20 is supported in bearings 21 and 22 within the head 16 and has a worm wheel 23 keyed thereto and arranged to be driven by the worm shaft 17.

A gear 24 rotatable on the shaft 20 meshes with a rack 25 secured to the super-structure 13 and the gear 24 is provided with clutch teeth 26 arranged to be engaged by clutch teeth 27 on a movable clutch member 28 keyed to the shaft 20 and operable by a lever 29. Engagement of the clutch teeth 26 and 27 causes the gear 24 to travel along the rack 25 for moving the head 16 along the tracks 15. The head 16 also supports a cross-head 30 provided with slides 31, in which a transverse moving structure 32 is mounted. Within the structure 32 is a worm shaft 33 arranged to mesh with a worm wheel 34 fixed to a stud shaft 35, which is journaled in bearings 36, and a bearing 37 within the end of the shaft 20.

A clutch member 38 is fixed to the stud shaft and a movable clutch member 39 is fixed to the shaft 20. A lever 40 operates the clutch. Engagement of the clutch causes rotation of the worm wheel 34 for causing the worm wheel to move the shaft 33 and the structure 32 transversely of the movement of the head 16. A squared end 41 on the shaft 33 provides means for using a wrench to manually rotate the screw 33 for properly locating a cutting tool relative to the work in setting up a job.

A pair of guides 45 are secured to a vertically movable member 46 and are suitably clamped in adjusted position in the structure 32 by means of lock nuts 47. A screw 48 is journaled in bearings 49 in the member 46 and has threaded connection with the structure 32, as indicated at 50. A worm wheel 51 is secured to the lower end of the screw 48 and is rotated by means of a worm 52 having squared ends 53 arranged to receive a suitable wrench for rotating the screw and raising or lowering the tool holder. A pull pin 54 is mounted in the member 46 having its end 55 arranged to engage apertures 56 in a motor supporting yoke 57. There are four apertures 56 arranged at right angles to each other to permit the yoke 57 to be moved to four positions; that is, to present the cutting tool on either the right or left side of the motor in either a longitudinal plane or a transverse plane to the work table.

The yoke 57 rotates on a plate 58 suitably bolted to the member 46. A special motor housing 60, houses an electric motor 61 pivoted within the yoke 57 and is arranged to be tilted in a vertical plane within the yoke by means of having extending bearings 62 provided with clamp plates 63. Suitable bolts and nuts 64 lock the motor in adjusted position.

A suitable tool holder 65 extends from the motor and in the present instance is shown as a shaft supporting an abrading wheel 66, but it will be apparent that any other cutting tool may be suitably mounted or attached to the shaft 65 or a shaping tool holder may displace the motor mounting to permit planar cuts to be taken on the work.

The cross-head 30 is rotatably mounted on the head 16 by means of T bolts 70 clamping the cross-head 30 to the head 16 and gibs 71 received over the flange 72 on the head 16. Thus it is apparent that the cross-head 30 can be moved about the head 16 to cause the lower structure and tool holder to move in various planes for producing angular cuts on the work.

Assuming it is desired to cut a slab of material into a parallelogram formation, the material is clamped to the bed 14 and the cutter adjusted to the proper height by means of rotating the screw 53 and the pull pin 54 is set in the proper notch for causing the abrading wheel 66 to travel in the proper direction on the work which would be in the present exemplification at right angles to the position shown in Fig. 1. The fluid motor is engaged for causing the worm 17 to rotate for imparting rotation to the worm wheel 23. The clutch handle 29 is moved downwardly to the position shown in Fig. 1 for causing engagement of the clutch teeth 26 and 27, causing the pinion gear 24 to rotate with the shaft 20 along the rack 25, whereby the tool holder and its component parts will move lengthwise of the super-structure.

When the cut is completed and through the operation of suitable clutches the reversal of the screw 17 takes place and the entire tool holder is returned to its starting position. The cross-carriage 32 can be moved transversely of the head 30 for moving the cutter to the opposite side of the work for performing a similar cut on that side of the work. If it is desired to cut the other edges of the work in an angular direction; that is, at an angle of lesser or greater degree than a right angle to the previous cut, the head 30 is rotated on the head 16 for positioning the cutter and the head 30 at the proper angle for the cut. During this cutting operation the clutch lever 29 is moved upwardly for disengaging the clutches 26 and 27 and the clutch lever 40 is moved downwardly for engaging the clutches 38 and 39 for causing the worm wheel 34 to move endwise along the worm 33, which in this instance acts as a rack for the worm wheel 34.

If it is desired to also cut a bevel on one of the edges of the material, the motor can be moved in a vertical plane about its pivot for presenting the cutter in an angular position relative to the work for causing the cutter to cut an angular edge on the material.

It will be apparent from the foregoing that I have devised a machine in which the work is held stationary and the tool can be presented or moved over the work in all directions it might be desirable to cut the material.

Having thus fully described my invention, what I claim as new, and desire to secure by Letters Patent, is:

1. A universal cutting machine comprising a work support, a super-structure above said work support, a carriage movable endwise on said super-structure, a second carriage horizontally movable in said first named carriage, a yoke depending from said carriage and rotatable thereon, and a power driven tool pivotally mounted in said yoke.

2. A universal cutting machine comprising a work support, a super-structure above said work support, a carriage movable on said super-structure, a second carriage horizontally movable in said first named carriage, a yoke depending from said second carriage, means for rotating said yoke, means for raising and lowering said yoke and a power driven tool pivotally mounted in said yoke.

3. A universal cutting machine comprising a work support, a super-structure above said work support, a carriage movable on said super-structure, a rotatable slide on said carriage, a second carriage horizontally movable in said slide, a yoke depending from said second carriage, means for rotating said yoke, and a power driven tool pivotally mounted in said yoke.

4. A universal cutting machine comprising a work support, a super-structure above said work support, a carriage movable in said super-structure, a rotatable slide on said carriage, a second carriage horizontally movable in said slide, a yoke depending from said second carriage, means for raising and lowering said yoke, means for rotating said yoke, and a power driven tool pivotally mounted in said yoke.

5. A universal cutting machine comprising a work support, a super-structure above said work support, a carriage movable in said super-structure, a rotatable slide on said carriage, a second carriage horizontally movable in said slide, a yoke depending from said second carriage, means for raising and lowering said yoke, means for rotating said yoke, a power driven tool pivotally mounted in said yoke and power means for imparting movement to said respective carriages.

6. A universal cutting machine comprising a work support, a super-structure above said work support, a carriage movable on said super-structure, a second carriage horizontally movable in said first named carriage, a yoke depending from said second carriage and horizontally rotatable thereon, and a tool mounted in said yoke.

7. A universal cutting machine comprising a work support, a super-structure above said work support, a carriage movable on said super-structure, a second carriage horizontally movable in said first named carriage, a support extending from said second carriage, a yoke depending from said last named support and horizontally rotatable thereon, means for raising and lowering said yoke and a tool mounted in said yoke.

8. A universal cutting machine comprising a work support, a super-structure above said work support, a carriage movable on said super-structure, a horizontally rotatable slide on said carriage, a second carriage movable in said slide, a support extending from said second carriage, a yoke depending from said last named support and horizontally rotatable thereon, and a tool mounted in said yoke.

9. A universal cutting machine comprising a work support, a super-structure above said work support, a carriage movable on said super-structure, a horizontally rotatable slide on said carriage, a second carriage movable in said slide, a yoke depending from said second carriage, means for raising and lowering said yoke, a motor rotatably mounted in said yoke, means for attaching a tool to said motor, and power means for imparting movement to said respective carriages.

FREDERICK W. GRAFF.